US010708496B2

(12) United States Patent
Abalos et al.

(10) Patent No.: US 10,708,496 B2
(45) Date of Patent: Jul. 7, 2020

(54) ANALYTICS BASED POWER MANAGEMENT FOR CAMERAS

(71) Applicant: Cisco Technology, Inc., San Jose, CA (US)

(72) Inventors: Nicholas Dye Abalos, San Francisco, CA (US); Ian Matthew Snyder, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 70 days.

(21) Appl. No.: 15/909,487

(22) Filed: Mar. 1, 2018

(65) Prior Publication Data

US 2019/0273866 A1    Sep. 5, 2019

(51) Int. Cl.
*H04N 5/232* (2006.01)
*H04N 7/18* (2006.01)
*G08B 29/18* (2006.01)
*H04N 5/247* (2006.01)
*G08B 13/196* (2006.01)
*H04N 7/01* (2006.01)

(52) U.S. Cl.
CPC ....... *H04N 5/23241* (2013.01); *G08B 13/196* (2013.01); *G08B 29/181* (2013.01); *H04N 5/23203* (2013.01); *H04N 5/23216* (2013.01); *H04N 5/23222* (2013.01); *H04N 5/23229* (2013.01); *H04N 5/232411* (2018.08); *H04N 5/247* (2013.01); *H04N 7/181* (2013.01); *H04N 7/0127* (2013.01)

(58) Field of Classification Search
CPC ........... H04N 5/23241; H04N 5/23203; H04N 5/23222; H04N 7/181; H04N 5/23216; H04N 7/0127
See application file for complete search history.

(56) References Cited

U.S. PATENT DOCUMENTS

| | | | |
|---|---|---|---|
| 6,031,999 A | 2/2000 | Ogawa | |
| 9,948,902 B1* | 4/2018 | Trundle | H04N 7/183 |
| 2012/0001883 A1* | 1/2012 | Tarkoma | G09G 5/00 345/211 |
| 2014/0347475 A1* | 11/2014 | Divakaran | G06K 9/00771 348/135 |
| 2016/0080652 A1 | 3/2016 | Shirota et al. | |
| 2016/0295113 A1 | 10/2016 | Iqbal | |
| 2017/0076571 A1* | 3/2017 | Borel | G08B 13/19669 |
| 2019/0080575 A1* | 3/2019 | Lee | H04N 5/232411 |

OTHER PUBLICATIONS

Invitation to Pay Additional Fees and, Where Applicable, Protest Fee, from the International Searching Authority, dated Jun. 13, 2019, 11 pages, for corresponding International Patent Application No. PCT/US2019/019663.

* cited by examiner

*Primary Examiner* — Nhan T Tran
(74) *Attorney, Agent, or Firm* — Polsinelli PC (57) ABSTRACT

Systems and methods are disclosed for managing power use of a camera and/or camera system. In response to a wakeup trigger, contents of a scene are captured by the camera. Based on a received energy budget for the camera, a scene analysis is performed on the scene, where the contents of the scene are analyzed according to one or more analytics models. Based on the output of the one or more analytics models and the received energy budget for the camera, it is determined whether the camera should continue capturing the contents of the scene or enter a power state lower than a previous power state (e.g., go to sleep).

20 Claims, 8 Drawing Sheets

ANALYTICS BASED POWER MANAGEMENT FOR CAMERAS

TECHNICAL FIELD

The present technology pertains to wireless cameras, and more specifically to applying analytics models to intelligently manage the power consumption of wireless cameras.

BACKGROUND

Video camera systems can record audio and video in a surrounding area, which users can analyze to monitor and analyze events captured by the recorded audio and video, such as crimes and security events. Captured events in the recorded audio and video can be analyzed in real-time in order to monitor the surrounding area, or at a later time to review the events that transpired in the surrounding area over a period of time. Networking capabilities also allow users to control video camera systems over the network, receive the recorded audio and video over the network, and remotely monitor the surrounding area or review captured events. Video camera systems can also include audio and video processing capabilities to perform monitoring and detection operations, such as human detection, facial recognition, motion detection, etc. Such processing capabilities allow video camera systems to better monitor and detect specific conditions of interest, human activity and identification. The various recording and processing capabilities of video camera systems make such systems effective tools for deterring crime, protecting humans and property, and investigating events.

Wireless cameras are proving very popular among modern security consumers due to their low installation costs and flexible mounting options. For example, there is no need to run expensive video extension cables, and wireless cameras can be mounted and/or installed in locations previously unavailable to standard wired cameras. In addition to the ease of use and convenience of access, wireless security cameras allow users to leverage broadband wireless internet to provide seamless video streaming over the internet.

However, battery powered camera systems have limited uses because their energy budgets prevent them from recording continuously over a long period of time. Their capabilities are limited to live viewing, short motion based recording, or scheduled captures. Device size/form factor and battery costs prevent manufacturers from being able to scale up their energy budgets. A user wanting to view a live feed from a camera, for example, has no indication of whether or not the footage will be valuable before actually starting the feed. This means that a user could be powering up a camera and wasting valuable battery life to view live footage that has no value.

While motion based triggers can greatly reduce the drain from a camera's battery over continuous recording, the reduction works only if motion is infrequent. Current consumer products repeatedly wake up from a sleep state, or a low power consumption state on motion based triggers to record for a set amount video (e.g., for 30 seconds), with no regard to what they are filming. This often results in cameras that film a series of non-important video clips, reducing the battery life to a couple of days, rather than months or years they would have if they had been more intelligent in their recording.

Moreover, even energy harvesting/solar cameras that are currently found in the market suffer problems. They require large, non-integrated panels to get the energy required to operate in a similar manner to a standard battery powered camera. Their lack of integration of the solar cells makes them significantly more difficult to deploy than a standard camera.

Accordingly, there is a need to provide a long-lived camera system appropriate for the energy budgets of most commercial camera systems beyond simple motion based triggers.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DESCRIPTION OF EXAMPLE EMBODIMENTS

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Overview:

Systems, methods, and devices are disclosed for managing power use of a camera and/or camera system. In response to a wakeup trigger, the contents of a scene are captured by the camera. The camera can perform an intial analysis on at least a portion of the the captured contents of the scene, where the content of the scene are analyzed according to one or more analytics models. Based on the output of the one or more analytics models and the energy budget for the camera, the camera can determine whether the camera should continue to capture the contents of the scene, enter a low power state, or perform some other power saving function.

Example Embodiments:

Analytics based power management solves the problem of small, battery powered wireless cameras by greatly increasing the intelligence in deciding whether or not to power up a low powered video camera. This analytics based intelligence can drastically increase power savings, resulting in a more efficient, lower maintenance system.

The disclosed technology performs a brief wakeup that records a video clip or image to record the contents of a scene based on some sort of trigger. The contents of the scene are then determined based on analytics that, depending on the camera's energy budget needs, can be performed in various locations. A camera within the system can then use contextual rules to decide whether to keep recording based on how the camera behavior fits into the energy budget, and can even pass its determinations to other cameras in the system. If the scene does not fit the camera's power budget, for example, another camera that can afford the budget can record the event instead.

Analytics based power management significantly increases battery life and decreases power strains for low-power video systems. Intelligently determining the importance of a given scene drastically cuts down on the number of false triggers, and likewise drastically cuts down on the total up-time for power sensitive cameras. For a user to view a live feed, for example, a camera must be powered up. Existing systems, however, require the user to decide if there's anything important in the FOV (field of view), but only after the camera has been powered up and the user has looked at the live view.

Analytics based power management, however, can inform the user whether or not there is any event occurring before the live stream is viewed (or in lieu of manual user management), potentially allowing the camera system to dynamically power up the camera, using the portion of battery life the camera needs, or save power by turning it off, redirecting power to a second camera, redirecting power usage to remote sources, etc.

Moreover, analytics may not need to be re-run across multiple cameras if the results of the analysis of the captured contents is shared across the cameras in the camera system. For example, if one camera detects an object or event, and that object or event is going to move into the view of a second camera, the first camera can share its information with the second camera before the second camera runs its analytic phase. For example, the first camera can share with the second camera an identification of the object being a cow walking across a field from the first camer's view into the second camera's view. Thus, the second camera can wake up and start recording without wasting power on analytics (e.g., can receive the identification of the cow and wake up without having to perform scene analysis at all). Alternatively, if the first camera determines that an event in its or the second camera's field of view (FOV) is not important, that information can be similarly shared with the second camera so that it can skip its analytic phase as well, further saving on power usage cycles.

Thus, in the embodiments disclosed, power usage of a camera is managed by performing a brief wakeup in response to a wakeup trigger. The contents of a scene captured by the camera are analyzed according to one or more analytics models, and based on the output of analytics models and an energy budget for the camera, the camera and/or camera system can determine whether to continue capturing the contents of the scene or to perform power saving functions (e.g., putting the camera to sleep, redirecting functions to a second camera or remote system components, etc.).

Figure 1:
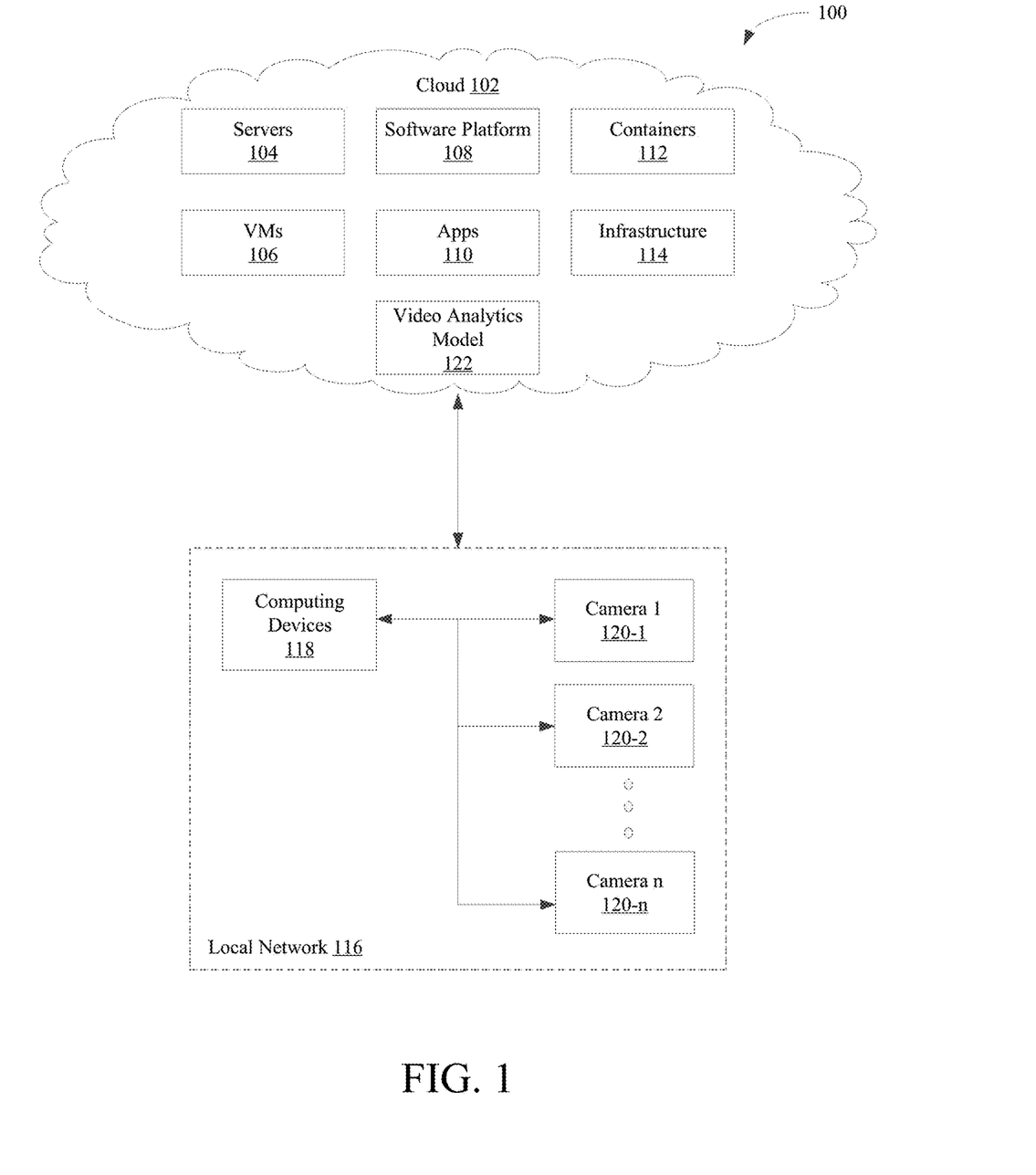
FIG. 1 illustrates an example camera and video management environment.

FIG. 1 illustrates an example camera and video management environment 100. A local network 116 can include one or more cameras 120-1, 120-2, . . . , 120-n (cameras 120), and computing devices 118 configured to communicate with each other over the local network 116. Computing devices 118 can include any network-capable devices, such as laptops, phones, access points, switches, servers, televisions, network storage systems (SANs), tablet computers, kiosks, Internet of things (IoT) devices, etc. Cameras 120 can include one or more types of cameras with networking and data storage capabilities.

Cameras 120 can be set up in various locations to capture and record/store data from their respective locations. Each camera 120 can record video and audio and store the recorded video and audio locally and/or transmit the recorded video and audio to other devices for storage, monitoring, analysis, etc. Each camera 120 can communicate with other cameras over the local network 116, as well as other devices. For example, each camera 120 can probe the others for data, conditions, management, etc. As another example, camera 120 can communicate with one or more of computing devices 118 to transmit recorded data and/or receive management instructions.

In some embodiments, local network 116 can be communicatively coupled to one or more remote networks, which in this example is represented by cloud 102. It should be noted that the one or more remote networks are not limited to cloud networks or environments. Cloud 102 is illustrated herein for clarity and explanation purposes, as other types of networks and network environments are also possible and contemplated herein.

Cameras 120 and computing devices 118 can communicate with cloud 102 via local network 116. In this example, cloud 102 can include one or more private, public, and/or hybrid clouds. Moreover, cloud 102 can include, for example, servers 104, virtual machines (VMs) 106, one or more software platforms 108, applications or services 110, software containers 112, infrastructure nodes 114, and video analytics models 122. Infrastructure nodes 114 can include various types of nodes, such as compute nodes, storage nodes, network nodes, management systems, etc. In some cases, Infrastructure nodes 114 can include a controller for managing cameras 120, computing devices 118, and/or local network 116. Video analytics models 122 can include one or more models that analyze data captured and sent by cameras 120.

Cloud 102 can provide various cloud computing services, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), function as a service (FaaS), cloud-based management services, and other types of services such as desktop as a service (DaaS), information technology management as a service (ITaaS), managed software as a service (MSaaS), mobile backend as a service (MBaaS), etc.

Cameras 120 and computing devices 118 can communicate with cloud 102 via one or more public networks (e.g., Internet), private networks, and/or hybrid networks. For example, in some cases, cameras 120 can communicate with cloud 102 via a virtual private network (VPN) or tunnel between the cameras 120 on the local network 116 and the cloud 102. Cameras 120 can send captured data, such as video feeds, to video analytics model 122 for analysis in the cloud 102. Output from video analytics model 122 can be shared back with any of cameras 120 in local network 116.

Figure 2:
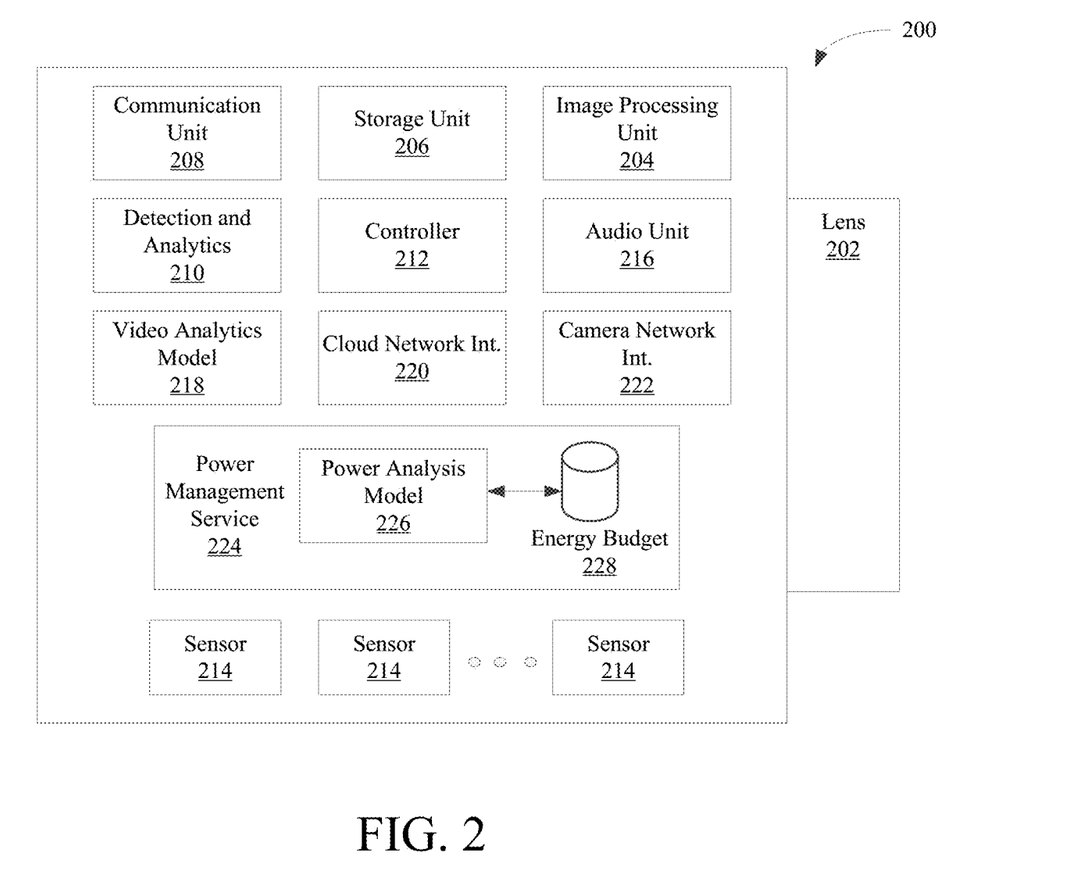
FIG. 2 illustrates an example architecture of an example camera system.

FIG. 2 illustrates an example architecture 200 of an example camera 120. Architecture 200 can include lens 202 for capturing video and images. Lens 202 can include an image sensor. In some cases, lens 202 can include various adjustment parameters, such as tilt, rotation, pan, focus, FOV, etc. Lens 202 can also include other imaging parameters, such as aperture, image quality parameters, zoom parameters, shutter speed, etc.

Image and video data captured by lens 202 can be provided as input to other components in camera system 120, such as image processing unit 204 and detection and analytics unit 210. Image processing unit 204 can provide one or more image and video processing capabilities based on the input from lens 202. For example, image processing unit 204 can process input signals to generate frames of pixels and process the frames to enhance the image content. Image processing unit 204 can also perform other image and video processing capabilities such as, for example, video encoding/decoding, filtering, pixel correction, enhancement, focusing, brightness adjustment, etc.

Architecture 200 can include one or more sensors 214 for detecting various signals and conditions, such as image sensors, motion sensors, noise sensors, light sensors, CMOS sensors, flame detection sensors, proximity sensors, biosensors, machine vision sensors, video sensors, smart scene sensors, tracking sensors, speech recognition sensors, multimodal sensors, hall effect sensors, speed sensors, smoke sensors, metal detector sensors, explosive detection sensors, impact sensors, shock sensors, pressure sensors, moisture sensors, heat sensors, position sensors, tilt sensors, air flow sensors, chemical sensors, gyroscopes, accelerometers, etc. Sensors 214 can include hardware and/or software sensors, as well as other components such as processors, memory, etc.

Architecture 200 can also include one or more audio units 216. Audio units 216 can include audio speakers, microphones, audio signal processing elements, etc. Audio units 216 can capture and detect sound, and determine sound characteristics, such as source, localization, intensity, timing cues, spectral cues, patterns, etc. For example, audio units 216 can include one or more microphones to detect audio and can include logic to recognize the audio (e.g., human, environmental, etc.), recognize the level or intensity of the audio, identify the location or origin of the audio, identify the direction and distance of the audio, recognize speech, recognize specific types of sounds, etc.

Data calculated or collected from sensors 214 and/or audio unit 216 can be provided to detection and analytics unit 210, which can implement such data along with image and/or video data to detect specific characteristics or conditions in the content of any of the captured data, detect objects and events, and perform other detection operations.

For example, detection and analytics unit 210 can analyze various aspects of the captured data, such as pixels, frames, sound, images, frame sequences, sensor data, etc., to perform detection operations. Non-limiting examples of detection operations can include tamper detection, blocking (i.e., blocking of the lens 202), re-positioning (i.e., camera and our lens re-positioning), focus changes, impact detection, human detection, object-in-hand detection, sound classification, facial recognition, video segmentation, object recognition, motion detection, event detection, lighting detection, smart scene detection, etc.

Storage unit 206 can include one or more storage or memory devices for storing captured data, such as video and image data recorded by camera system 120, metadata associated with the recorded data, sensor data, recognition data, etc. Storage unit 206 can include one or more solid state storage devices, disk storage devices, and/or any type of storage or memory devices.

Communications unit 208 can include one or more network interfaces for communicating with other devices over a network, such as local network 116. Communications unit 208 can include wireless and/or wired network interfaces. For example, in some cases, communications unit 208 can include a wireless network interface card for communicating with other devices via a wireless network (e.g., WIFI). Camera system 120 can send and receive data to and from network devices via communications unit 208.

Video analytics model unit 218 can include one or more video analytics models that analyze captured data to determine the contents and/or context of a recorded scene. The contents of a recorded scene may be determined and/or identified as specific kinds of animals (cow, sheep, etc.), people (employees vs. unidentified persons, etc.), objects (vehicles, weapons, etc.). Video analytics model unit 218 can, moreover, perform facial recognition on recorded people.

The context of a scene can be also determined via video analytics model unit 218. The context of a scene can be anything outside the identified contents, such as the surrounding environment, target movement, light levels, kind of target movement, etc. For example, video analytics model unit 218 can determine that camera 120 recorded the front of a building, people going into a building, people walking by the building, passing cars in a street, trusted vs. unknown people approaching camera 120. In some embodiments, video analytics model unit 218 can look for context associated with camera 120 or the camera system. For example, a camera system that includes agricultural cameras can detect a specific kind of animal (e.g., the content of the scene is a cow) doing a particular action (e.g., the context of the scene is the cow moving across the FOV).

Power management service 224 can receive input from video analytics model unit 218 and, based on the input, determine how to manage power across the system's devices (e.g., camera 120, computing devices 118, cloud 102, etc.). For example, energy budget store 228 can include one or more power budgets for the system and/or individual cameras within the system. Power budgets can be received manually from a user or can be received from cameras 120 that inform energy budget store 228 their respective power resources. Energy budget store 228 can also store a user specified energy budget. The user specified energy budget can be an energy budget tailored to the user's needs, such as an energy budget that allows the cameras of the system to run for at least 1 month, 1 year, etc.

Power analysis model unit 226 can communicate with cameras 120 and/or determine the power consumption of the entire system and individual cameras within the system. For example, power analysis model unit 226 can determine that the system has 25% power remaining across all cameras; that camera 1 has 12% power remaining and, at its current recording behavior, is draining power by 0.5% every 24 hours; camera 2 has 40% power remaining and, at its current recording behavior, is draining power by 0.05% every 16 hours; etc. Power analysis model unit 226 can also apply one or more models to predict future power usage. Predictions can include the power consumption across a certain time range at current average recording behavior (camera 1 will have 1% power remaining in 22 days at its current rate of 0.5% power consumption every 24 hours) or projected power consumption for a different/modified recording behavior (camera 1 can last up to 367 days at an adjusted rate of 0.03% power consumption every 24 hours). Power analysis model unit 226 can use the models or predictions to determine power consumption needs to be adjusted to fit the user specified energy budget (e.g., camera 1 needs to conserve more power by reducing quality, skipping events, etc.; camera 2 can shoulder more power consumption needs from other cameras; expensive image/video analysis needs to be offloaded to the cloud 102, etc.).

Controller 212 can include rules, policies, logic, instructions, etc., to manage power operations of cameras 120. The power operations can include prioritizing which camera should be activated, how long the cameras should be activated, triggers that initiate camera activation, timing of camera activation, communication between cameras, etc. Controller 212 can process input from power management service 224 and/or video analytics model unit 218, detect conditions, stored rules and settings, and other factors to determine when to initiate camera activation, which cameras to activate, where to activate cameras, how to prioritize which cameras are activated and/or performing analysis, determine when to trigger changes in camera activation, etc. Controller 212 can also include rules or instructions for communicating with between individual cameras as part of a determination for which cameras to activate, where to activate each camera, how to prioritize activation of each camera, which camera (if any) performs image/video analysis, determine when to trigger changes in each camera's activation, etc., as further described below. Controller 212 can also coordinate with the network and other devices on lighting operations.

The components in architecture 200 described herein are non-limiting examples provided for clarity and explanation purposes. It should be noted that other configurations can include more or less components, can include components that are a combination of one or more components illustrated, and can include components that are not illustrated in architecture 200 but would be recognized by one of skill in the art.

Figure 3:
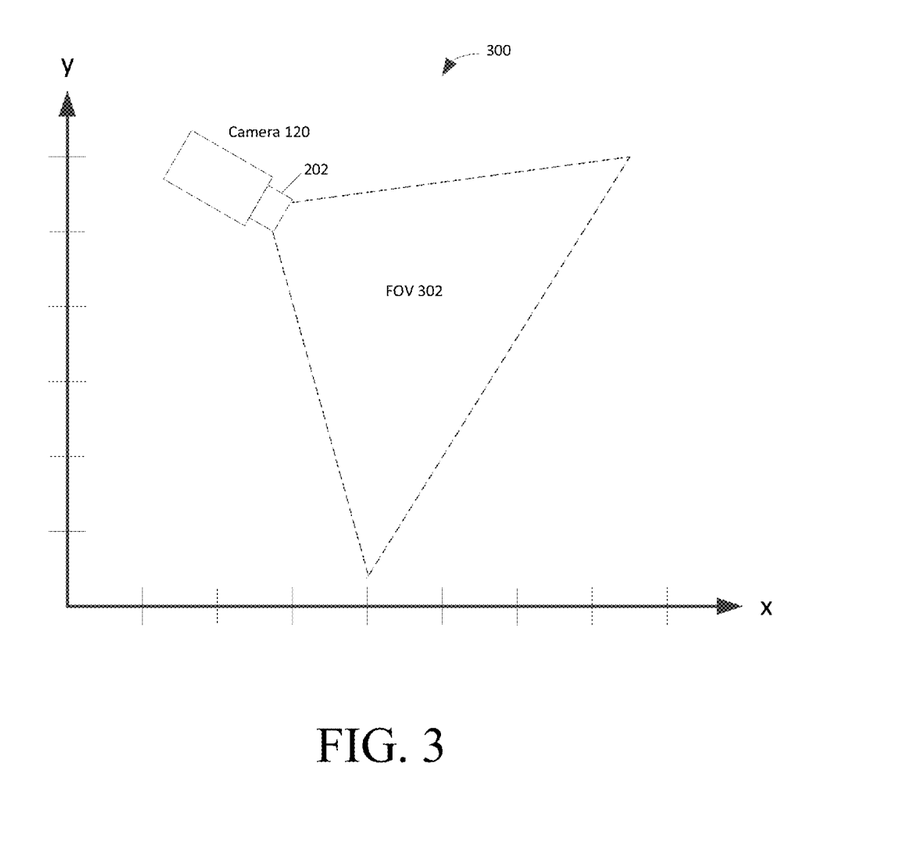
FIG. 3 illustrates an example diagram of a field of view of a camera.

FIG. 3 illustrates an example diagram 400 of a field of view 302 of a camera 120 recording a scene with architecture 200 or similar. FIG. 3 shows how much of a scene can be seen or captured by camera 120. FOV 302 can include a view depth, width, angle, height, etc. FOV 302 can depend on various factors, such as the angle of the camera, the lens of the camera, the aperture of the camera, the focus of the camera, the zoom settings of the camera, etc.

For example, a narrow FOV may result when the camera is zoomed in, and may only show a small part of a scene (e.g., the door entrance to a room). On the other hand, a wide FOV may result when the camera is zoomed out, and may show a larger part of the scene (e.g., the entire room in addition to the door entrance).

Figure 4:
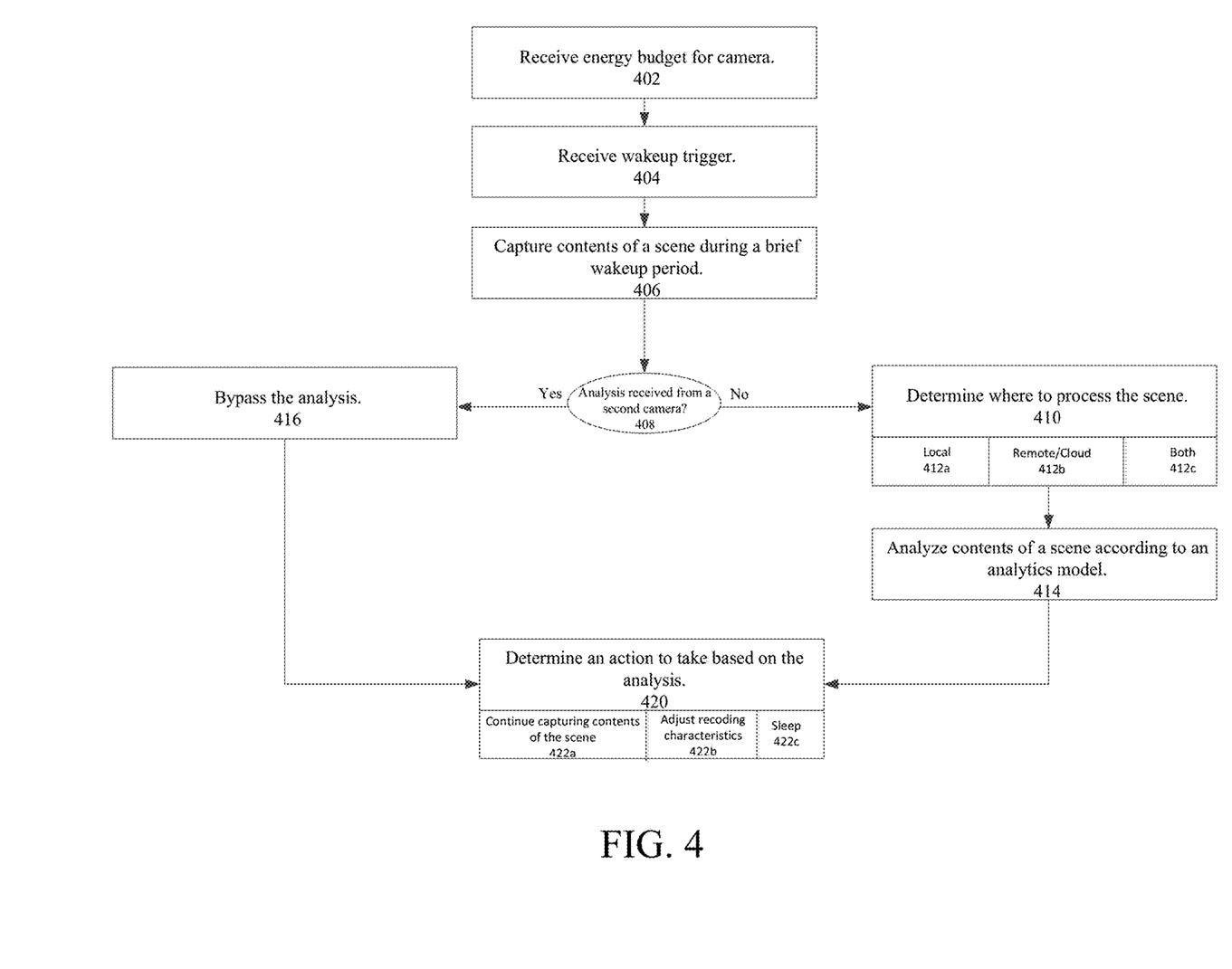
FIG. 4 is a flow chart illustrating an example embodiment for power management optimization based on a video analytics model.

FIG. 4 is a flow chart illustrating an example embodiment for power management optimization based on one or more video analytics models. For each camera 120 within the system, an energy budget is received from the user, cloud 102, or power management service 224, etc. (step 402). For example, the energy budget can associated with how much power should be consumed to last a period of time, such as a specification that camera 120 should last for another 15 months. To conserve power, camera 120 can default to a sleep mode (low power state) that consumes little, if any, power.

At some point, a trigger will initiate camera 120 activation, which will briefly wake up camera 120 (step 404). Wakeup triggers can be related to anything that suggests a target of interest is present (or about to be present) in the scene, such as triggers associated with motion, low-fidelity/low-power human detection sensors (e.g., passive IR sensors), sound (footsteps, voices, etc.), time based (every 2 seconds), etc.

Recordings (video clips) and/or images can be captured by camera 120 during the brief wakeup period (step 406). In some embodiments, a brief video clip is recorded or a single image is captured and selected for initial analysis, and the method moves to the next step. In other embodiments, a brief video clip or image is selected for initial analysis, but camera 120 continues to record live video. While this option consumes more power than the previous option, continuing to record while the video is being analyzed enables camera 120 to not lose any footage. This can be crucial for security systems, for example, where it is better to configure the camera to record the entire sequence of a potential crime.

The contents and/or context of the scene are then analyzed according to one or more analytics models (e.g., video analytics model unit 218 on camera 120 and/or video analytics model 122 on cloud 102). The contents of the scene can be determined in various ways, such as by locating and identifying people, objects, or animals using computer vision techniques. Analytics rules determine the existence of predetermined conditions within the video clip or image. The analytics can be performed in one or more locations: on the camera, in the cloud, and received from another camera that has already performed the analysis (step 408).

Figure 5:
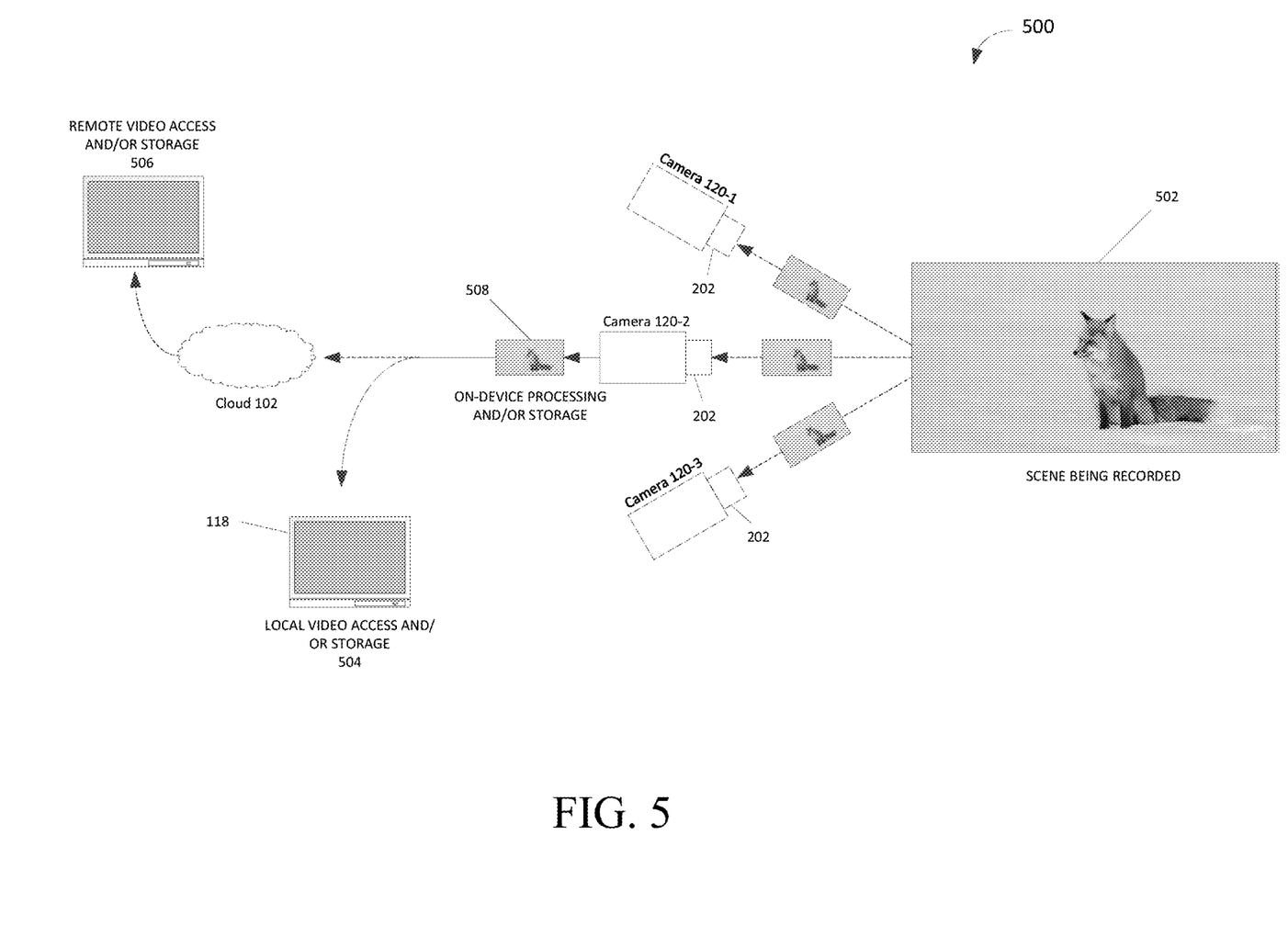
FIG. 5 illustrates an example diagram for capturing and monitoring video within a camera's field of view (FOV) in an example video camera environment.

FIG. 5 illustrates an example diagram 500 for capturing and monitoring video within a camera's FOV in an example video camera environment, such as camera and video management environment 100. In this example, camera systems 120-1, 120-2, 120-3 are capturing and recording a scene 502 via their respective lenses 202. Depending on their respective FOVs and positions, the scene 502 captured by the camera systems 120-1, 120-2, 120-3 can be the same scene or different, respective scenes. In some cases, the scene 502 can be the same scene captured from different perspectives by the camera systems 120-1, 120-2, 120-3 based on one or more factors associated with the camera systems 120-1, 120-2, 120-3, such as respective positions or locations, respective angles, respective proximities, respective camera settings, etc. For explanation purposes, the examples below will describe the scene 502 as the same scene captured from the camera systems 120-1, 120-2, 120-3.

The camera systems 120-1, 120-2, 120-3 can capture the scene 502 and store respective recorded data 502-1, 502-2, 502-3 locally at the camera systems 120-1, 120-2, 120-3 (e.g., storage unit 206). The recorded data 502-1, 502-2, 502-3 can include raw and/or processed image or video data, such as pixels and frames; metadata, such as timestamps, tags, classification information, labels, file or content descriptions, file information, frame information, titles, etc.; sensor data captured by the camera systems 120-1, 120-2, 120-3 as part of the recording; etc.

The camera systems 120-1, 120-2, 120-3 can store the recorded data 502-1, 502-2, 502-3 locally 508 on their respective storage (e.g., storage units 206) as previously mentioned, and/or transmit the recorded data 502-1, 502-2, 502-3 to one or more nodes 118 and/or cloud 102. For example, the camera systems 120-1, 120-2, 120-3 can transmit the recorded data 502-1, 502-2, 502-3 to a node 118 on the local network 116 for local storage or display 504 at the node 118, and/or to cloud 102 for remote storage or display 506 at cloud 102.

The stored recorded data 502-1, 502-2, 502-3 can be processed and initally analyzed according to analytics models that identify the contents of the scene and whether any contextual conditions have been met that initiate camera activation from a sleep state (or, vice versa, initiate power down procedures to save power). The camera systems 120-1, 120-2, 120-3 can analyze the recorded data 502-1, 502-2, 502-3 locally 508 on each camera, and/or transmit the recorded data 502-1, 502-2, 502-3 to one or more nodes 118 and/or cloud 102 for analysis. For example, if no individual camera has the appropriate power resources, analysis can be done on cloud 102 where power resources are much larger.

In some cases, camera systems 120-1, 120-2, 120-3 can transmit the recorded data 302-1, 302-2, 302-3 to node 118 and/or cloud 102 as a video feed for local display at node 118 and/or remote display at cloud 102. Cloud 102 can also receive such a video feed and provide the video feed for access (e.g., display) by other devices over a network, such as the Internet. For example, cloud 102 can receive the video feed and allow other devices to stream the video feed from cloud 102 for presentation at the devices. Thus, users can access the video feed on cloud 102 from any device and monitor scene 502 being recorded by the camera systems 102-1, 120-2, 120-3.

Referring back to FIG. 4, once a brief video clip or image is captured in response to a wakeup trigger, the system and/or each camera (say, camera 120-1) determines where to process the scene (step 410). The simplest approach would to locally process analyze the contents of the scene (step 412*a*). While processing local to camera 120-1 doesn't require a wireless connection to cloud 102 or other cameras (which slows processing down), the energy budgets for each small, battery powered wireless camera limits the amount of processing that can be used.

Processing and analysis, however, may be performed remote from camera 120-1 (step 412*b*). Power management service 224 and/or camera 120-1 could, for example, indicate that the scene analysis should not be performed by camera 120-1 because the energy budget is less than the energy needed for local camera processing.

For example, the system and/or camera 120-1 could send the briefly recorded video clip/image to another camera (say, camera 120-2) with greater power resources. In that way, processing can be performed on the cameras best able to handle them, such as cameras with large batteries, cameras in low traffic locations, etc. While remote processing requires a wireless connection that has an energy transaction cost for uploading video and waiting for a response, power may still be conserved because the computational requirements to process the video or image on camera 120-1 is greatly reduced.

Additionally and/or alternatively, remote processing and analysis can be performed on cloud 102. While processing on cloud 102 also requires a wireless connection, the energy needed for video clip/image capture and local processing on camera 120-1 can still be greater than the energy consumed after video clip/image capture, wireless upload, idle waiting time, and processing cloud response combined. Moreover, lower energy, local network radios (e.g., WiFi) could be used to relay information through other "awake" cameras that are already using or planning to use a higher energy, cloud link (e.g., LTE) to conserve energy. Adding more cameras would improve the average energy consumption.

The system can also take into consideration the quality of the wireless link and the impact on energy consumption. For example, a bad LTE connection would require more energy to use, so the quality of the uploaded file might be reduced, it may relay information to another camera with an active "good" LTE connection, or the camera might choose to stick with on camera analytics and decision making.

In some embodiments, the system can take a hybrid approach to video/image processing and analysis (step 412*c*). Some areas or portions of the image/video may be processed remotely from camera 120-1 (at cloud 102 or another camera in communication with camera 120-1) after it is determined that camera 120-1 cannot or should not process the image/video, while other areas of the image/video are processed locally on camera 120-1. Basic analytics, for example, can be used to select key areas of the image/video (human, object, etc.) for uploading to cloud 102 for additional processing and context, while the rest of image/video is processed at camera 120-1. For example, some areas may need more processing than other areas (areas around a moving animal need more processing than areas associated with static background). This reduces bandwidth. Alternatively, only the selected key areas can be uploaded to cloud 102, while the rest of the image/video is left unprocessed.

Some embodiments may be flexible or may dynamically assign/reassign processing to different locations. For example, camera 120-1 may experience more wakeups than average (or an anomalous flurry of triggers) such that the system determines that, based on the received energy budget being less than the energy budget needed for local camera processing, the scene analysis should no longer be performed by camera 120-1 if the power requirements are not to exceed the budget. In this case, the system can transfer processing on the fly to another camera (camera 120-2) to handle the processing. However, if it is determined that none of the cameras can handle the new processing requirements, the scene may be processed on cloud 102 to stay within the power budget.

Figure 6:
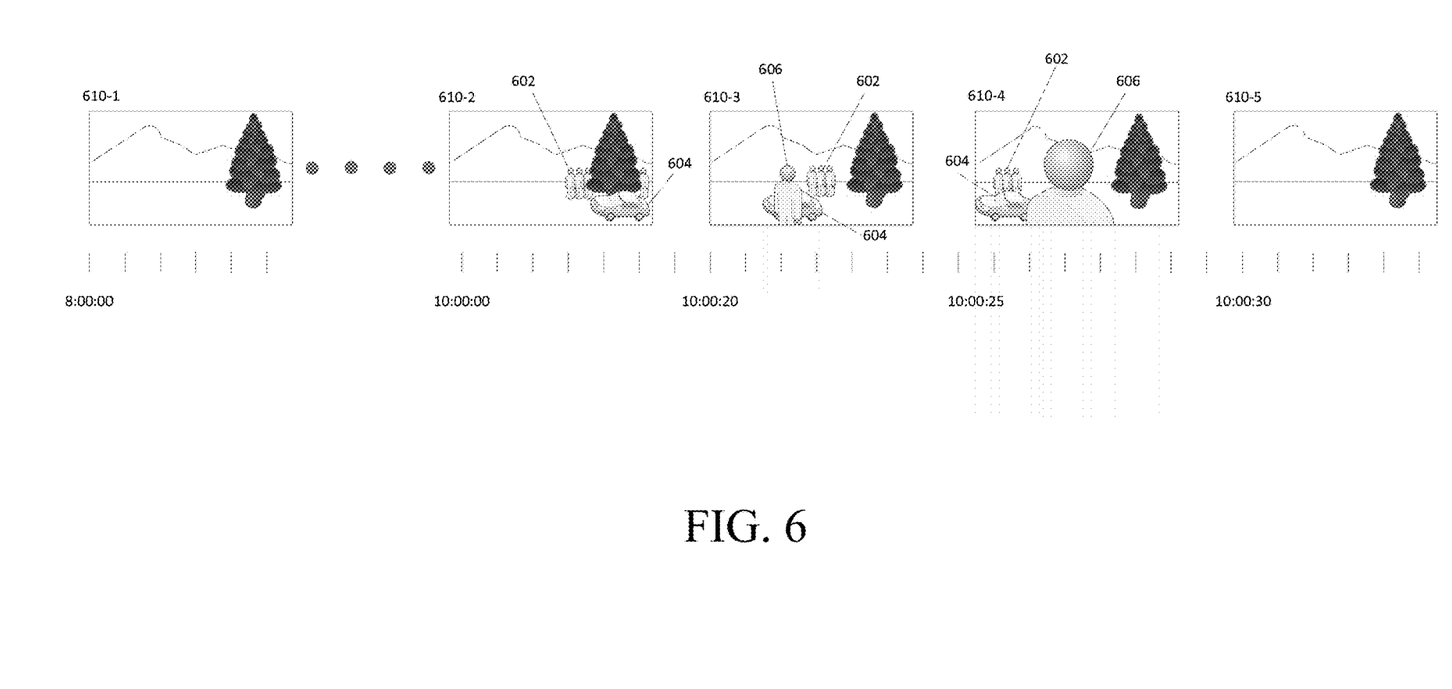
FIG. 6 illustrates example frames captured by a camera.

The contents of the scene are then analyzed according to one or more analytics models that identify the content of the scene, the context of the scene, or both (step 414). FIG. 6, for example, illustrates example frames captured by a camera.

Frames 610-1, 610-2, 610-3, 610-4, and 6-10-5 show camera 120-1's FOV, which shows numerous objects and people are capable of triggering a brief wakeup of camera 120-1. Frame 610-1 shows a default scene with nothing by environment in its FOV. However, at time 10:00:00 hours, frame 610-2 shows that targets 602 and 604 are present within the FOV. Both target 602 and target 604 are moving, and in some embodiments it can be determined that target 602 is composed of multiple people. Targets 602 and 604 can be classified or identified within the image or frame, using one or more image classification algorithms that match the detected targets to machine vision models or techniques of known objects, animals, or people. The image classification algorithms can be one or more models of objects, animals, and people in different positions or orientations. While the image classification algorithms can be generated, stored, and/or processed locally on the camera, in some embodiments, the classification of the target can be based on a model stored remotely from the device (e.g., such as in the cloud). In this case, target 602 can be classified as a group of people and target 604 can be classified as an automobile.

At frame 610-2, both target 602 and target 604 are in the background and moving in the same direction. The directionality of the targets can be used to determine whether a wakeup is triggered. For example, a direction that indicates that the targets are merely passing by (such as is the case in frame 610-2 as the targets move parallel to the surface/building the camera is mounted on) can cause the system or camera 120-1 to refrain from or suppress a wakeup response.

However, at frame 610-3 and 610-4 at time 10:00:20-10:00:25 hours, respectively, target 606 begins to move from the background to the foreground (e.g., has split from the group and is approaching camera 120-1). As target 606 approaches, the system and/or camera 120-1 can determine that target 606 is of interest, and may not be merely passing by. Wakeup of camera 120-1 may be triggered.

After initial processing, target 606 may be classified to a particular individual (e.g., a specific employee vs. an unidentified person) based on facial recognition. For example, target 606 may not match an employee, and in that case recording may be extended beyond the brief wakeup period until the threat has passed (e.g., frame 610-5).

In some instances, the scene may have already been processed by another camera. For example, an person may have entered camera 120-3's FOV before entering camera 120-1's FOV. Camera 120-3 could analyze the video to determine that the entering target is a trusted employee (e.g., facially recognizes the person as a known janitor). In that case, since camera 120-3 has already determined and identified the target, camera 120-3 can transmit the identification to camera 120-1 prior to camera 120-1 processing the target. In that way, either all or a portion of the processing can be bypassed by camera 120-1 (step 416).

Once processing and analysis has identified the contents and/or context of the scene, the system and/or camera 120 determines which action to take in accordance with the power budget (step 420). For example, based on the output of the one or more analytics models and the energy budget (of the system, camera, received by the user, etc.), camera 120-1 could continue capturing the contents of the scene past the wakeup period (step 422a), adjust camera 120-1's recording characteristics (decrease frame rate, decrease quality, etc.) (step 422b), request camera 120-2 to wakeup/record (if camera 120-2's FOV overlaps with camera 120-1's FOV), or go to sleep (step 422c).

What action the camera takes depends on a determination of whether the triggering event is important. Importance can be determined by the mere content of the scene (e.g., any persons are considered of interest), but importance can also be determined in part or in whole on the context of the scene. For example, camera 120-1 can record persons going into a building, but sleep when it is determined that the persons are merely walking by the building. Passing cars could also be identified and camera 120-1 could sleep. Or, if camera 120-1 is a parking lot camera looking for vandals, it can be determined if the targets in the video are trusted people vs. unknown people, and scenes that would show only trusted people are ignored. Alternatively, camera 120-1 could record scenes only with specific and known people-of-interest. If camera 120-1 is an agricultural camera looking for a specific kind of animal (cow, sheep, etc.), it can sleep on movement from other kinds of animals but wakeup if there is movement in the scene associated with the animals of interest.

In some embodiments, the system and/or camera 120 can predict energy usage and use the prediction to consider how a proposed recording fits into the power budget. Based on the prediction, the camera can be configured to last a period of time by reducing one or more of frame rate, image fidelity, or ending recording to capture images only. For example, if camera 120-1 is a solar camera and forecasted weather indicates energy harvesting yield will be low for the next few days, camera 120-1 may reduce quality, skip events, etc. Cameras with batteries can take battery replacement schedules into consideration. If the target date is 1 year, the system/camera need to make sure behavior matches that goal.

Deciding whether to continue recording/start recording or return to sleep/low-power mode can be based on one or more pre-determined conditions. If conditions are met, camera 120-1 records. If not, camera 120-1 goes to sleep. For example, a pre-determined condition can be that recording should only be triggered if a person is approaching camera 120-1, or a cow is within the FOV, or facial recognition cannot identify a person. The recording initiated by the brief wakeup can be ended when the event is no longer important/relevant. Or if the conditions were met and recording did start, the system can also intelligently stop the recording and go back to low-power mode once conditions are no longer met.

In some embodiments, the analytics can determine that certain conditions justify more resources for further processing and/or analysis. For example, simple conditions (only record if a cow is identified) may cost a small amount of energy to process. But more accurate, sophisticated conditions may need to be processed on cloud 102. Furthermore, the system may be associated with multiple conditions simultaneously, such that rules that specify conditions need to be processed at different locations (locally, remotely, or both). Users can also configure new rules or add layers to the rules. Thus, knowing how much each rule will cost in power, power management can proceed much like in applying the analytics.

Figure 7:
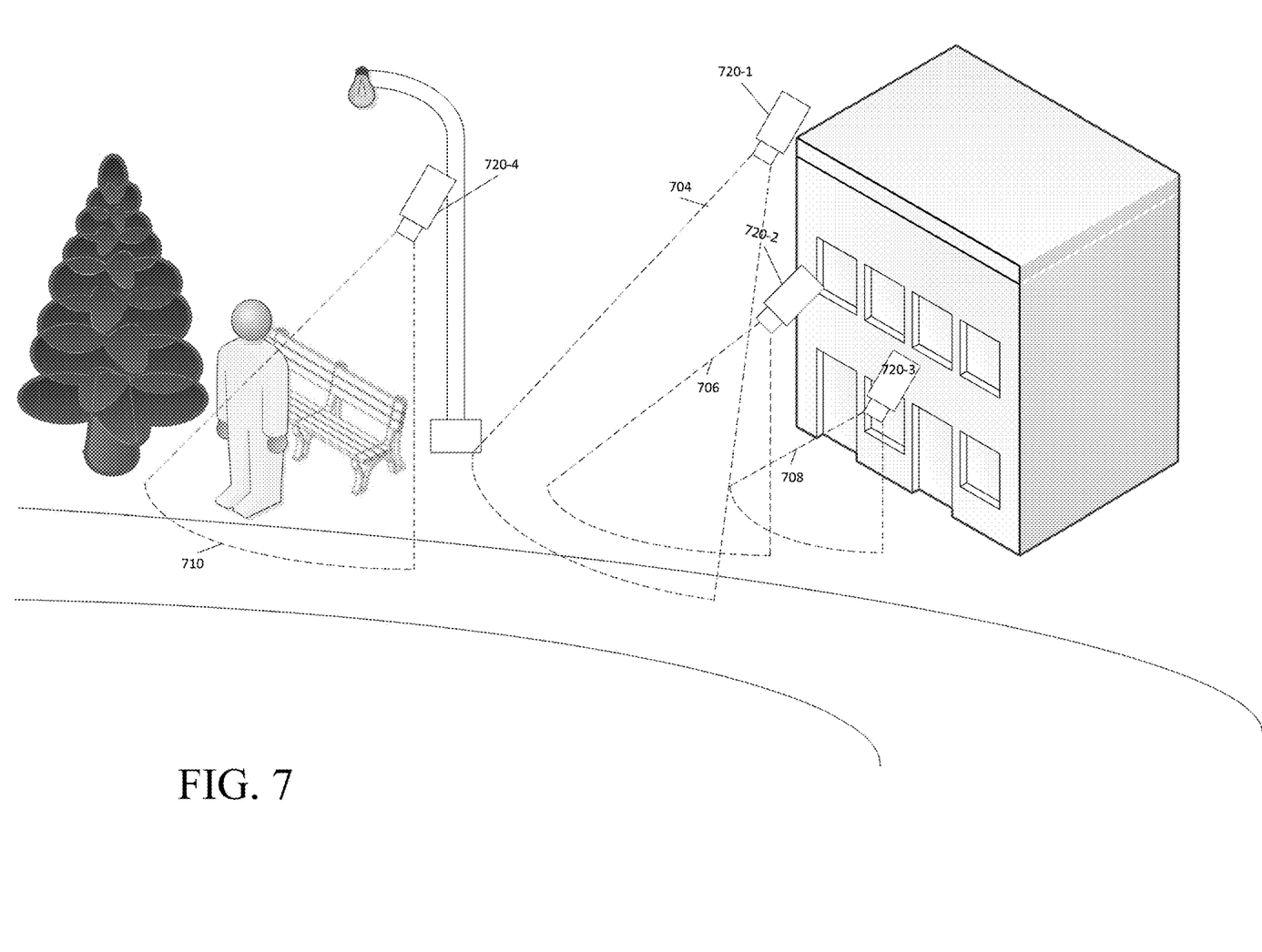
FIG. 7 illustrates an example placement of multiple cameras in a particular site.

In other embodiments, wakeup behavior can be adjusted as needed. For example, information from one scene can help determine if there will be a new scene coming up. FIG. 7, for example, illustrates an example placement of multiple cameras in a particular site that can adjust wakeup behavior of other cameras in the system. In this example, cameras 720-1, 720-2, 720-3, 720-4 are positioned at different locations in a site to capture different scenes at the site. For example, camera 720-1 is located at a second floor location of a building, which allows the camera 720-1 to capture and record video within the FOV 704 of camera 720-1 from the second floor location.

Camera 720-2 is located at first floor location on a side of the building, which allows the camera 720-2 to capture and record video within FOV 706 of the camera 720-2 from the first floor location.

Camera system 720-3 is located on a front door location of the building, which allows the camera system 720-3 to capture and record video within the field of view 708 of the camera system 720-3 from the front door location.

Camera 720-4 is located on a light post location, which allows the camera system 720-4 to capture and record video within the FOV 710 of the camera 720-4 from the light post location.

As illustrated, cameras 720-1, 720-2, and 720-3 can capture different angles, areas, objects, etc., of a site based on their respective locations and FOVs 704, 706, 708, and 710. In some configurations, the FOV of two or more cameras may overlap. For example, FOV 704 of camera 720-1 can overlap with FOV 706 of camera system 720-2 to yield an overlapping area of coverage. The overlapping area of coverage can be useful to capture different angles and perspectives of the same area.

Because the FOVs 704 and 706 of cameras 720-1 and 720-2 provide an overlapping area of coverage, both cameras 720-1 and 720-2 can detect conditions, events, objects, threats, etc., that take place within the overlapping area of coverage. Thus, when detecting a condition, event, object, threat, etc., pertaining to the overlapping area of coverage, the cameras 720-1 and 720-2 can communicate with each other to verify, enhance, or compare detection results. The different angles and/or perspectives provided by the cameras 720-1 and 720-2 can help when performing a detection operation pertaining to the overlapping area of coverage (e.g., whether a target is approaching the building or simply passing by, for example).

Camera 720-3 can furthermore communicate to cameras 720-1 and 720-2 that a target is approaching a building. Thus, the system can predict a target trajectory and optimize processing and power consumption before the target is even captured by cameras 720-1 and 720-2.

As illustrated in this example, multiple camera systems can be configured to overlap coverage in certain areas, such as high incident or value areas, and/or maximize the overall coverage at the site. Overlapping coverage can be used to obtain cross-checking and verification of capture and detection results. Data captured for non-overlapping areas can also be combined to provide a greater overall view or depiction of a site and/or detection results for one or more areas in the site. For example, one camera may capture a criminal event from a human, while another camera may capture the event(s) leading up to the criminal event. To illustrate, one camera system may capture the crime and another camera system may capture a fleeing direction of the criminal. The data captured, and intelligence ascertained, from the non-overlapping areas of coverage of the two camera systems can be combined to enhance the overall understanding of the event and/or detection operations associated with the event.

Figure 8:
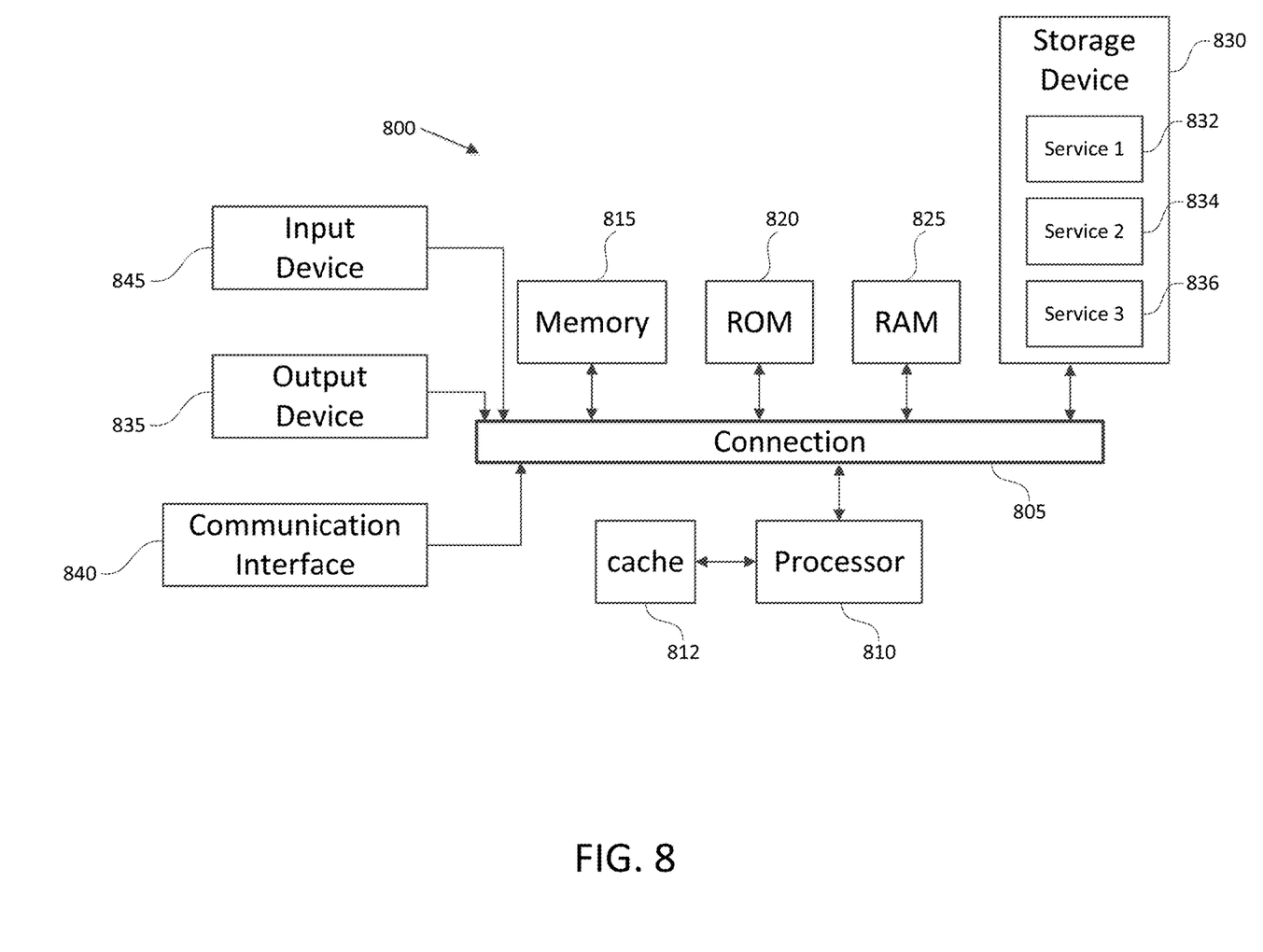
FIG. 8 illustrates an example network device.

FIG. 8 shows an example of computing system 800 in which the components of the system are in communication with each other using connection 805. Computing system 800 can be included within any of camera devices 120 or computing device 118 as described herein. Connection 805 can be a physical connection via a bus, or a direct connection into processor 810, such as in a chipset architecture. Connection 805 can also be a virtual connection, networked connection, or logical connection.

In some embodiments computing system 800 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read only memory (ROM) and random access memory (RAM) to processor 810. Computing system 800 can include a cache of high-speed memory connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method of managing power use of a camera, the method comprising:
capturing by the camera contents of a scene in response to a wakeup trigger;
determining whether another camera has analyzed the captured contents of the scene;
performing an initial analysis, in response to a negative result of the determining, on at least a portion of captured contents of a scene by one or more analytics models, wherein the one or more analytics models output information regarding contents of the scene; and
determining, by a camera, whether to continue capturing the contents of the scene or to enter a low power state based on the output information regarding the contents of the scene and an energy budget for the camera.

2. The method of claim 1, further comprising:
determining that further analysis of captured contents of the scene should not be performed by the camera when the energy budget is less than an amount of energy needed for performing the further analysis on the camera.

3. The method of claim 1, wherein the one or more analytics models output information that the captured contents of the scene includes a first area and a second area, the method further comprising:
determining that the further analysis for the first area should not be performed by the camera when the energy budget is less than an amount of energy needed for performing the further analysis on the camera; and
determining that the further analysis for the second area should be performed by the camera.

4. The method of claim 1, further comprising:
predicting an energy usage of the camera based on historical power consumption data; and
based on predicting the energy usage of the camera, configuring the energy budget for the camera to last at least a specified period of time by reducing one or more of frame rate, image fidelity, or ending recording to capture images only.

5. The method of claim 1, the method comprising:
transmitting the information regarding the contents of the scene to a second camera so that the second camera can determine whether to further capture the contents of the scene.

6. The method of claim 1, the method comprising:
receiving the contents of the scene from a second camera, wherein the second camera did not have the energy budget to perform the initial analysis on the at least the portion of captured contents of the scene.

7. A camera comprising:
at least one processor and at least one memory containing instructions that, when executed, cause the at least one processor to:
capturing by the camera contents of a scene in response to a wakeup trigger;
determining whether another camera has analyzed the captured contents of the scene;
perform an initial analysis, in response to a negative result of the determining, on at least a portion of captured contents of a scene by one or more analytics models, wherein the one or more analytics models output information regarding contents of the scene; and
determine, by the camera, whether to continue capturing the contents of the scene or to enter a low power state based on the output information regarding the contents of the scene and an energy budget for the camera.

8. The camera of claim 7, wherein the at least one processor is further configured to:
determine that further analysis of captured contents of the scene should not be performed by the camera when the energy budget is less than an amount of energy needed for performing the further analysis on the camera.

9. The camera of claim 7, wherein the scene includes a first area and a second area, and wherein the at least one processor is further configured to:
determine that the further analysis for the first area should not be performed by the camera when the energy budget is less than an amount of energy needed for performing the further analysis on the camera; and
determine that the further analysis for the second area should be performed by the camera.

10. The camera of claim 7, wherein the at least one processor is further configured to:
predict an energy usage of the camera based on historical power consumption data; and
based on the predicted energy usage of the camera, configure the energy budget for the camera to last at least a specified period of time by reducing one or more of frame rate, image fidelity, or ending recording to capture images only.

11. The camera of claim 7, wherein the at least one processor is further configured to:
transmit the output information regarding the contents of the scene to a second camera so that the second camera can determine whether to further capture the contents of the scene.

12. The camera of claim 7, wherein the at least one processor is further configured to:
receive the contents of the scene from a second camera, wherein the second camera did not have the energy budget to perform the initial analysis on the at least the portion of captured contents of the scene.

13. A system for managing power use of a camera system, comprising:
a first camera configured to:
capture by the first camera contents of a first scene in response to a first wakeup trigger;
determining whether another camera has analyzed the captured contents of the scene;
perform a first initial analysis, in response to a negative result of the determining, on at least a portion of captured contents of the first scene by one or more analytics models, wherein the analytics models output information regarding contents of the first scene; and
determine, by the first camera, whether to continue capturing the contents of the first scene or to enter a low power state based on first output information regarding the contents of the first scene and an energy budget for the first camera.

14. The system of claim 13, further comprising:
a second camera in communication with the first camera, the second camera configured to:
capture contents of a second scene in response to a second wakeup trigger;
perform a second initial analysis on at least a portion of captured contents of the second scene by one or more analytics models, wherein the analytics models output information regarding contents of the second scene; and
determine, by the second camera, whether to continue capturing the contents of the second scene or to enter a low power state based on second output information regarding the contents of the second scene and an energy budget for the second camera.

15. The system of claim 14, wherein a portion of the first scene overlaps with a portion of the second scene, and the second camera is configured to:
receive a communication from the first camera informing the second camera that the first camera will not perform further analysis on captured contents of the first scene; and
perform further analysis on captured contents of the first scene based on the received communication from the first camera.

16. The system of claim 14, wherein a portion of the first scene overlaps with a portion of the second scene, and the portion of the first scene that overlaps with the portion of the second scene, the first camera and second camera are configured to:
determine that the first camera will perform further analysis on a first area and the second camera will perform further analysis on a second area based on a determination that the second area requires more processing than the first area, and the second camera has more processing capabilities than the first camera.

17. The system of claim 14, wherein a portion of the first scene overlaps with a portion of the second scene, and wherein the second camera is configured to:
communicate identified contents of the second scene to the first camera, and
the second camera is configured to: determine to enter the low power state rather than perform further analysis on the captured contents of the first scene based in part of the identified contents of the second scene.

18. The system of claim 14, further comprising a server in communication with the first camera and the second camera to:
determine that the further analysis should not be performed by the first camera based on the energy budget being less than an amount of energy needed;
when the second camera has an energy budget sufficient to perform further analysis on the contents of the scene, transmit the contents of the scene to the second camera for the further analysis; and
based on a determination that both the first camera and the second camera do not have the energy budget to perform further analysis on the contents of the scene, process the scene on the server.

19. The system of claim 13, further comprising a server in communication with the first camera, the server analyzing the scene based on a determination from the first camera that the analysis of the contents of the scene should not be performed by the first camera when the energy budget is less than an amount of energy needed to perform the analysis in compliance with the energy budget.

20. The system of claim 13, further comprising a server configured to:
predict energy usage of the first camera; and
based on the predicted energy usage of the first camera, configure the energy budget for the camera to last at least a specified period of time by reducing one or more of frame rate, image fidelity, or ending recording to capture images only.

* * * * *